(12) United States Patent  
Sharpe et al.

(10) Patent No.: US 7,117,417 B2
(45) Date of Patent: Oct. 3, 2006

(54) METHOD FOR GENERATING CLOCK CORRECTIONS FOR A WIDE-AREA OR GLOBAL DIFFERENTIAL GPS SYSTEM

(75) Inventors: Richard T. Sharpe, Torrance, CA (US); Ronald R. Hatch, Wilmington, CA (US); Frederick W. Nelson, Waukee, IA (US)

(73) Assignee: Navcom Technology, Inc., Torrance, CA (US)

( * ) Notice: Subject to any disclaimer, the term of this patent is extended or adjusted under 35 U.S.C. 154(b) by 438 days.

(21) Appl. No.: 10/630,302

(22) Filed: Jul. 30, 2003

(65) Prior Publication Data

US 2005/0024263 A1    Feb. 3, 2005

(51) Int. Cl.
G06F 11/00 (2006.01)
G01S 1/00 (2006.01)
G01C 21/26 (2006.01)

(52) U.S. Cl. ............ 714/746; 342/357.02; 342/357.12; 701/214

(58) Field of Classification Search ............ None
See application file for complete search history.

(56) References Cited

U.S. PATENT DOCUMENTS

| | | | | |
|---|---|---|---|---|
| 5,471,217 A | * | 11/1995 | Hatch et al. | 342/357.02 |
| 5,621,646 A | | 4/1997 | Enge et al. | 364/449 |
| 5,828,336 A | | 10/1998 | Yunck et al. | 342/357 |
| 5,899,957 A | | 5/1999 | Loomis | 701/214 |
| 6,215,441 B1 | * | 4/2001 | Moeglein et al. | 342/357.01 |
| 6,266,009 B1 | | 7/2001 | Hwang | 342/357.12 |

FOREIGN PATENT DOCUMENTS

EP     0609935 A2    8/1994

OTHER PUBLICATIONS

Kee, C., et al., "Algorithms and Implementation of Wide Area Differential GPS," Proceedings of the Institute of Navigation, GPS 1992, Albuquerque, New Mexico, Sep. 18, 1992, pp. 565-572.

Hwang, P.Y., et al., "Enhanced Differential GPS Carrier-Smoothed Code Processing Using Dual Frequency Measurements," Proceedings of the Institute of Navigation, Nashville, Tennessee, Sep. 18, 1998, pp. 461-470.

International Search Report for International Application No. PCT/US2004/023461, filed Jul. 20, 2004, dated Aug. 23, 2005.

(Continued)

*Primary Examiner*—Phung My Chung
(74) *Attorney, Agent, or Firm*—Morgan, Lewis & Bockius LLP

(57) ABSTRACT

A method for generating satellite clock corrections for a WADGPS network computers satellite clock corrections after removing other substantial error components. Errors caused by the ionosphere refraction effects are removed from GPS measurements taken at reference stations using dual-frequency GPS measurements. The multipath noise are removed by smoothing of GPS pseudorange code measurements with carrier-phase measurements. The tropospheric refraction effect can be largely removed by modeling, and if desired, can be improved by the use of small stochastic adjustments included in the computation of the clock correction. After removing the above error factors, satellite clock corrections are computed for individual reference stations, and an average clock correction is formed for each of a plurality of satellites by taking an average or weighted average of the satellite clock corrections over reference stations to which the satellite is visible.

25 Claims, 10 Drawing Sheets

OTHER PUBLICATIONS

Abousalem, Mohamed A., "Performance Overview of Two WADGPS Algorithms", GPS World, Innovation, May 1997, pp. 48-58.

Brown, Alison, "Extended Differential GPS", Navigation: Journal of the Institute of Navigation, vol. 36, No. 3, Fall 1989, pp. 265-285.

Essen, R.F. van, Offerrmans, G.W.A., Helwig, A.W.S., Willigen, D. van, Regional Area Augmentation Concept for Eurofix, "Reducing Spatial Decorrelation Effects through Multi-station DGNSS", Presented at: the 26th Annual Technical Symposium of the International Loran Association, Ottawa, Canada, Oct. 6-9, 1997, pp. 1-12.

Kee et al., "Wide Area Differential GPS", Navigation: Journal of the Institute of Navigation, vol. 38, No. 2, Summer 1991, pp. 123-145.

Hatch, R., "The Synergism of GPS Code and Carrier Measurements," Proceedings of the 3rd Int'l Geodetic Symposium on Satellite Doppler Positioning, DMA/NGS, Washington, DC, 1982, pp. 1213-1232.

* cited by examiner

METHOD FOR GENERATING CLOCK CORRECTIONS FOR A WIDE-AREA OR GLOBAL DIFFERENTIAL GPS SYSTEM

FIELD OF THE INVENTION

The present invention relates generally to positioning and navigation systems that use the Global Positioning System (GPS), and particularly to methods of computing satellite clock corrections for wide area or global differential GPS (DGPS) networks.

BACKGROUND OF THE INVENTION

GPS uses satellites in space to locate objects on earth. With GPS, signals from the satellites arrive at a GPS receiver and are used to determine the position of the GPS receiver. Currently, two types of GPS measurements corresponding to each correlator channel with a locked GPS satellite signal are available for civilian GPS receivers. The two types of GPS measurements are pseudorange, and integrated carrier phase for two carrier signals, L1 and L2, with frequencies of 1.5754 GHz and 1.2276 GHz, or wavelengths of 0.1903 m and 0.2442 m, respectively. Some receivers output a Doppler measurement which is simply the difference in two consecutive integrated carrier phase measurements. The pseudorange measurement (or code measurement) is a basic GPS observable that all types of GPS receivers can make. It utilizes the C/A or P codes modulated onto the carrier signals. The measurement records the apparent time taken for the relevant code to travel from the satellite to the receiver, i.e. the time the coded signal left the satellite according to the satellite clock minus the time it arrives at the receiver according to the receiver clock.

The carrier phase measurement is obtained by integrating a reconstructed carrier of the coded signal as it arrives at the receiver. Thus, the carrier phase measurement is also a measure of a transit time difference as determined by the time the signal left the satellite according to the satellite clock and the time it arrives at the receiver according to the receiver clock. However, because an initial number of whole cycles in transit between the satellite and the receiver when the receiver starts tracking the carrier phase of the signal is usually not exactly known, the transit time difference may be in error by the periods of a few carrier cycles, i.e. there is a whole-cycle ambiguity in the carrier phase measurement. Since the carrier frequencies are much higher and their pulses are much closer together than those of the C/A or P codes, the carrier phase measurement can be much more accurate than the code measurement. In addition, the code measurements are affected much more than the carrier phase measurements by the interference of reflected signals with the direct signal. This interference also causes the code measurements to be less accurate than the carrier phase measurements.

With the GPS measurements available, the range or distance between a GPS receiver and a satellite is calculated by multiplying a signal's travel time by the speed of light. These ranges are usually referred to as pseudoranges (false ranges) because the receiver clock generally has a significant time error which causes a common bias in the measured range. This common bias from receiver clock error is solved for along with the position coordinates of the receiver as part of the normal navigation computation. Various other factors can lead to errors or noise in the calculated range, including ephemeris error, satellite clock timing error, atmospheric effects, receiver noise and multipath error. To eliminate or reduce these errors, differential operations are typically used in GPS applications to cancel the noise factors in the pseudorange and/or carrier phase measurements resulting from these error sources. Differential GPS (DGPS) operations typically involve a base reference GPS receiver, a user GPS receiver, and a communication mechanism between the user and reference receivers. The reference receiver is placed at a known location and the known position is used to generate corrections associated with some or all of the above error factors. The corrections are supplied to the user receiver and the user receiver then uses the corrections to appropriately correct its computed position. The corrections can be in the form of corrections to the reference receiver position determined at the reference site or in the form of corrections to the specific GPS satellite clock and/or orbit. Corrections to the reference receiver position are not as flexible because, for optimum accuracy, they require that the same satellites be observed by the user receiver and the reference receiver.

The fundamental concept of Differential GPS (DGPS) is to take advantage of the spatial and temporal correlations of the errors inherent in the GPS measurements. The GPS satellite clock timing error (clock error), which appears as a bias on the pseudorange or carrier phase measurement, is perfectly correlated between the reference receiver and the user receiver. So, a DGPS system is capable of completely removing the clock error, which typically contributes about several meters of error to the user position.

The atmospheric effects are due to the GPS signal passing through the charged particles of the ionosphere and then through the water vapor in the troposphere. The effect of the ionosphere on the GPS signal is usually modeled by an ionospheric refraction model and errors in the model contribute to errors in the computed range. These errors are strongly correlated between the reference and user receivers over short distances between the two receivers, but the correlation diminishes over large distances.

Refraction of the GPS signal in the troposphere can generally be modeled to remove 90 to 95 percent of the tropospheric effects. The residual tropospheric errors can be reduced by the use of a DGPS when the user does not roam across large distances, because the correlation of tropospheric refraction error typically disappears as soon as the user is a few tens of kilometers away from the reference receiver. So the use of the DGPS by itself does not produce meaningful reductions of the residual tropospheric refraction error. Sometimes, the uncorrelated error at the reference receiver can even worsen the situation by introducing additional error into the computed user position.

The ephemeris or satellite orbital error can be modeled as having along-track, cross track, and radial error vectors. The satellite orbital error can be reduced by using the DGPS system. However, the reduction is somewhat limited because the correlation in the satellite orbital error gradually reduces as the separation between the reference and user receivers increases. The correlation is largely diminished over continental distances.

Receiver noise and multipath (reflected signal) effects are generally uncorrelated between the reference and user receivers. These error effects are sometimes amplified by the use of DGPS systems.

To overcome the inaccuracy of the DGPS system in wide-area applications, various wide area DGPS (WADGPS) techniques have been developed. The WADGPS includes a network of multiple reference stations in communication with a computational center or hub. Error corrections are computed at the hub based upon the known locations of the reference stations and the measurements taken by them. The computed error corrections are then transmitted to users via a communication link such as satellite, phone, or radio.

In some cases, raw data such as the measurements and positions of the reference receivers are supplied to the user receiver(s) rather than the corrections. The user receiver can select the data from a particular reference station or form corrections from a weighted combination of the data from the multiple reference stations.

By using multiple reference stations, WADGPS provides more accurate estimates of the error corrections. However, the use of multiple reference stations also makes computation of the error corrections more complicated and different error factors can alias into each other, destroying the correlations inherent in the GPS measurements.

SUMMARY OF THE INVENTION

The present invention includes a method for generating satellite clock corrections for a wide area differential GPS (WADGPS) network. In one embodiment of the present invention, the WADGPS network includes a plurality of reference stations each having a dual-frequency GPS receiver, which facilitates obtaining GPS measurements, including pseudorange code measurements and carrier phase measurements, on both the L1 and L2 carrier signals. With the dual frequency measurements, ionospheric refraction effects can be completely removed from the GPS measurements taken at the reference stations. Or, alternatively, a linear combination of carrier-phase measurements can be formed to match the ionospheric refraction effects of the corresponding code measurements. The removal of the ionospheric refraction effects or the difference between the ionospheric refraction effects on the code measurements and on the corresponding carrier phase measurements allows unlimited smoothing of the code measurements with the corresponding carrier-phase measurements. This in turn allows a virtual elimination of multipath noise after smoothing for a certain period of time, such as ten minutes or more. Satellite orbital errors, because they change much more slowly, can either be removed in a separate computational process when the WADGPS network is a global DGPS network, or can simply be ignored when the WADGPS network is for a continental sized region. The tropospheric refraction effect can be largely removed by modeling, and if desired, can be improved by the use of small stochastic adjustments included in the computation of the clock correction. After removing the above error factors, satellite clock corrections are computed for the individual reference stations. An average clock correction is formed thereafter for each of a plurality of satellites by taking an average or weighted average of the satellite clock corrections over reference stations to which the satellite is visible.

Because the method of the present invention computes satellite clock corrections after the removal of all other substantial error components, the method can be strikingly simple and very robust as compared to conventional methods, which often employ Kalman filters to solve for many different parameters simultaneously. The disadvantage of these conventional methods is that various error sources can alias into one another and destroy the perfect correlation inherent in the satellite clock errors.

DESCRIPTION OF THE INVENTION

Figure 1:
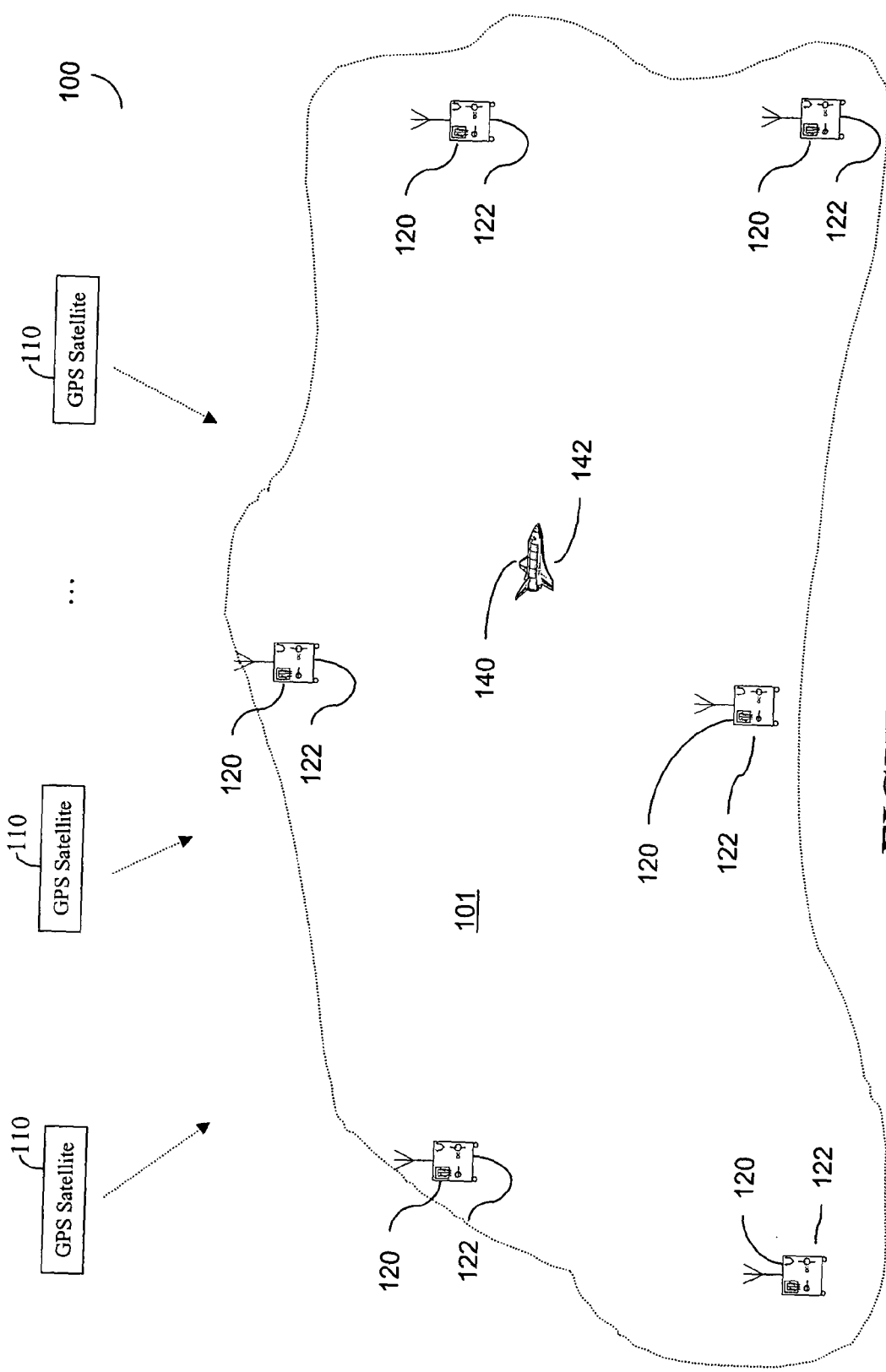
FIG. 1 is a block diagram of a WADGPS network according to one embodiment of the present invention.

FIG. 1 illustrates a wide-area or global DGPS (WADGPS) system 100 according to one embodiment of the present invention. As shown in FIG. 1, the WADGPS network 100 includes a plurality of satellites 110, a plurality of reference stations 120 each having a GPS receiver 122, and communication links (not shown) among the satellites 110 and the reference stations 120. The reference stations 120 are placed at known locations across a wide area 101, such as a continent, for a wide-area DGPS system, or across the globe for a global DGPS network. The WADGPS network 100 may be utilized by one or more users 140 each having a user GPS receiver 142 for positioning and/or navigation purposes.

Figure 2A:
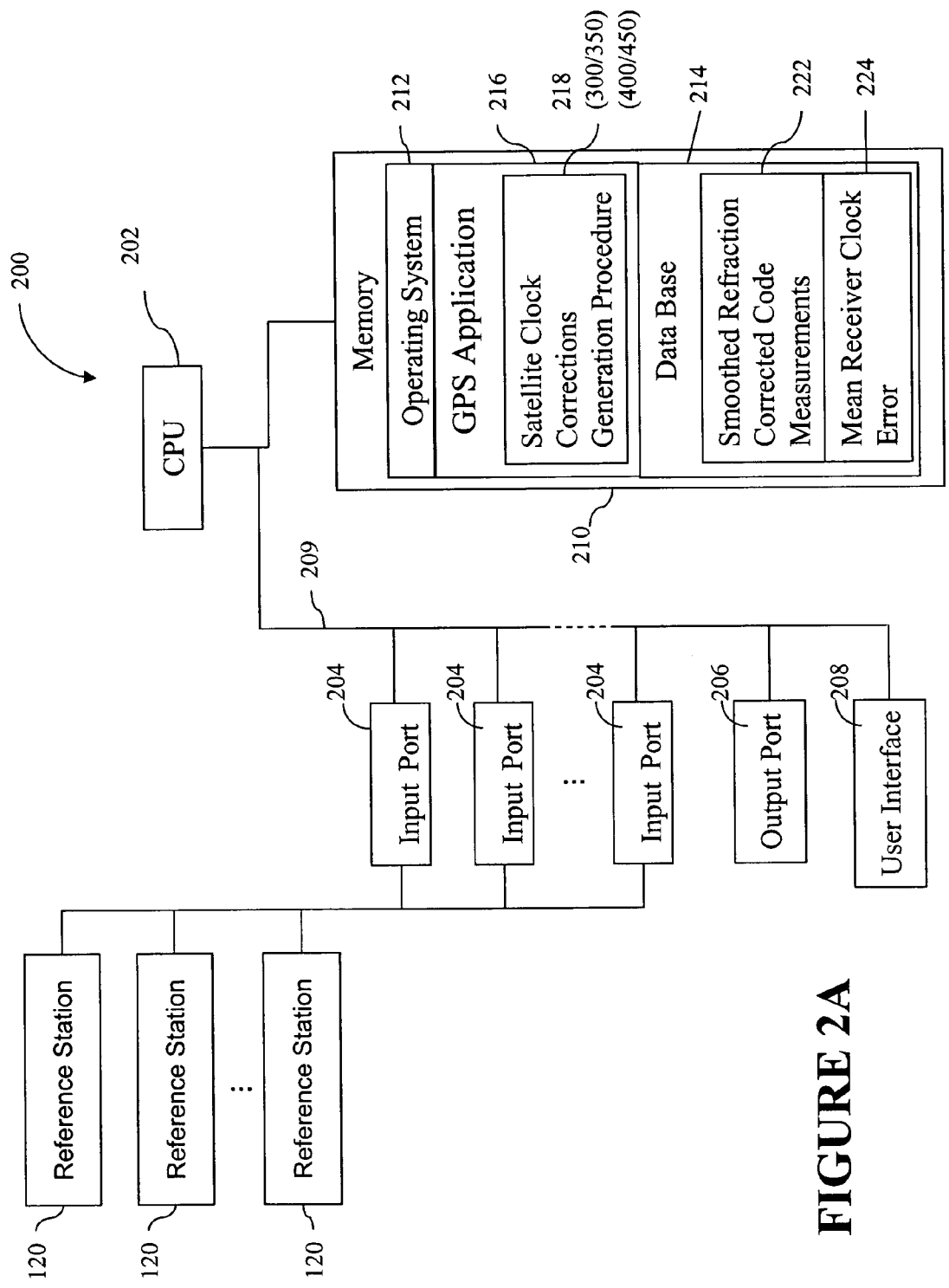
FIG. 2A is a block diagram of a computer system that serves as an example of a main computer system in the WADGPS network according to one embodiment of the present invention.

The WADGPS system 100 further includes a main computer system (not shown in FIG. 1) that is shared among the reference stations. The main computer system can be located at one of the reference stations or at a different place in or near the area 101. FIG. 2A shows a block diagram of an exemplary computer system 200 that can be used to as the main computer system. Referring to FIG. 2A, the computer system 200 can be a microprocessor-based computer coupled via the internet and/or various other communication links to the reference stations 120. Computer system 200 includes a central processing unit (CPU) 202, memory 210, a multitude of input ports 204 and an output port 206, and (optionally) a user interface 208, coupled to each other by one or more communication buses 209. The memory 210 may include high-speed random access memory and may include nonvolatile mass storage, such as one or more magnetic disk storage devices. Memory 210 may include mass storage that is remotely located from the central processing unit 202. The memory 210 preferably stores an operating system 212, a database 214, and GPS application procedures 216, including procedures 218 for implementing methods of generating satellite clock corrections in the embodiments of the present invention, as described in more detail below. The operating system 212 and application programs and procedures 216 and 218 stored in memory 210 are for execution by the CPU 202 of the computer system 200. The memory 210 preferably also stores data structures used during execution of the GPS application procedures 216 and 218, including the smoothed refraction corrected code measurements and mean receiver clock errors associated with individual reference stations as described below, as well as other data structures discussed in this document.

The operating system 212 may be, but is not limited to, an embedded operating system, UNIX, Solaris, or Windows 95, 98, NT 4.0, 2000 or XP. More generally, operating system 212 has procedures and instructions for communicating, processing, accessing and storing data, and for performing other basic operations.

The input ports 204 are for receiving data from the reference stations 120, and output port 206 is used for outputting data and/or calculation results. Data and calculation results may also be shown on a display device of the user interface 208. In one embodiments of the present invention, GPS measurement data taken at the reference stations are sent to the input ports 204 of the computer system 200 for processing by the computer system 200 according the procedures 218, as described in more detail below. Calculation results are output through the output port 206 of the computer system 200 and are sent via redundant communication links to an upload station among the reference stations 220. The upload station sends the correction data to one or more of the satellites 210 for broadcast to the user 240.

The computer system 200 usually includes a very high-speed processor since it may need to handle raw GPS measurement data from a multitude of GPS receivers. A continental WADGPS system usually has about 3 to 10 reference receivers and a global WADGPS system usually has about 20 to 100 reference receivers feeding data to the computer system 200.

Figure 2B:
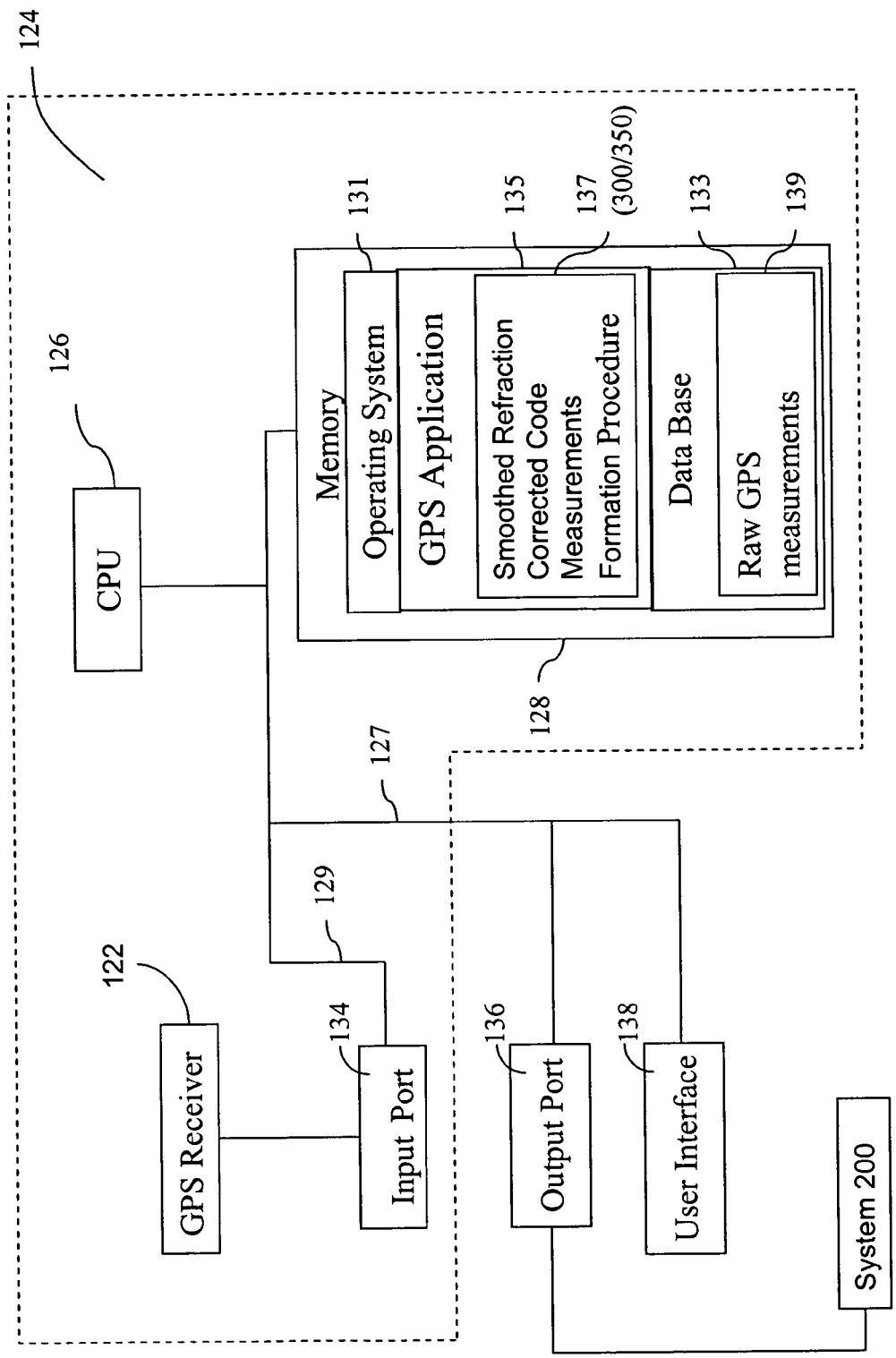
FIG. 2B is a block diagram of a computer system at a reference station in the WADGPS network according to one embodiment of the present invention.

In some applications, each of the reference stations 120 may include a computer system 124 coupled to the GPS receiver 122. As shown in FIG. 2B, a computer system 124 coupled to the GPS receiver 122 at a reference station 120 includes a central processing unit (CPU) 126, memory 128, an input port 134 and an output port 136, and (optionally) a user interface 138, coupled to each other by one or more communication buses 129. The memory 128 may include high-speed random access memory and may include non-volatile mass storage, such as one or more magnetic disk storage devices. The memory 128 preferably stores an operating system 131, a database 133, and GPS application procedures 135. The GPS application procedures may include procedures 137 for implementing methods of forming smoothed refraction corrected code measurements in the embodiments of the present invention, as described in more detail below. The operating system 131 and application programs and procedures 135 and 137 stored in memory 128 are for execution by the CPU 126 of the computer system 124. The memory 128 preferably also stores data structures used during execution of the GPS application procedures 135 and 137, including GPS pseudorange and carrier-phase measurements 139, as well as other data structures discussed in this document.

The input port 134 is for receiving data from the GPS receiver 122, and the output port 136 is used for outputting data and/or calculation results to the main computer system 200 of the WADGPS system. Data and calculation results may also be shown on a display device of the user interface 138. In one embodiment of the present invention, the CPU 126, the memory 128 and the input port 134 of the computer system 124 are integrated with the GPS receiver 122 into a single device, within a single housing, as shown by the dashed line in FIG. 2B. However, such integration is not required to carry out the methods of the present invention.

In one embodiment of the present invention, satellite clock corrections are computed using smoothed refraction-corrected code measurements associated with one or more reference stations. For each of the one or more reference stations, the smoothed refraction-corrected code measurements are formed at each measurement epoch from the pseudorange and carrier phase measurements taken by the GPS receiver at the reference station. Many GPS receivers make both a C/A-code measurement and a P-code measurement on the L1 or L2 frequency, and either of the C/A or P-code measurements can be used as the L1 or L2 code measurement. However, since small biases exist between the two measurements, whichever of the two is used in the reference receiver, the same should also be used for the equivalent process in the user GPS receiver(s). In the following discussion, for each satellite visible at the reference station, the L1 and L2 frequencies will be designated as $f_1$ and $f_2$, respectively, the raw pseudorange code measurements on the L1 and L2 frequencies at a measurement epoch will be designated as $P_1$ and $P_2$, respectively, and the raw carrier phase measurement on the L1 and L2 frequencies at the same measurement epoch will be designated as $\phi_1$ and $\phi_2$.

Figure 3A:
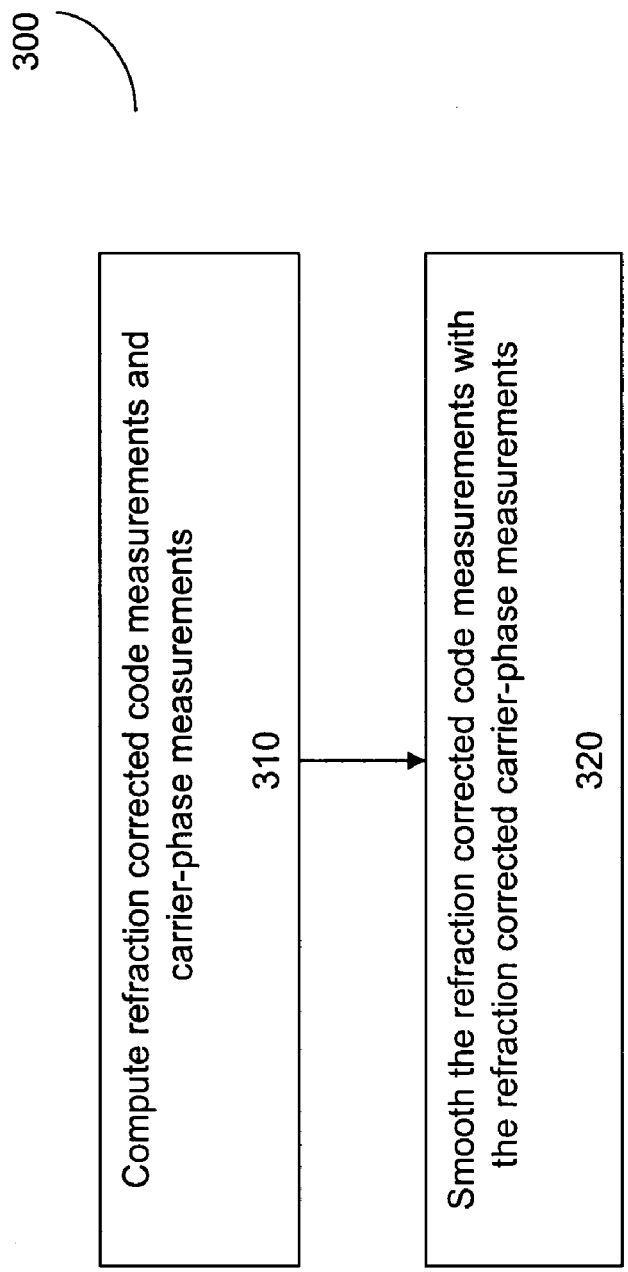
FIG. 3A is a flowchart illustrating a method for forming a smoothed refraction-corrected code measurement according to one embodiment of the present invention.

FIG. 3A illustrates a method 300 for obtaining a smoothed, refraction-corrected code measurement from GPS data taken at a reference station according to one embodiment of the present invention. As shown in FIG. 3A, method 300 includes step 310 in which the raw code and carrier-phase measurements for each satellite visible at the reference station are first refraction corrected to obtain refraction corrected code and carrier-phase measurements. The refraction-corrected code measurement, designated as $P_{RC}$, is formed as follows:

$$P_{RC} = \frac{f_1^2}{(f_1^2 - f_2^2)} P_1 - \frac{f_2^2}{(f_1^2 - f_2^2)} P_2 \cong P_1 - 1.5457(P_1 - P_2). \quad (1)$$

The refraction-corrected carrier-phase measurement, designated as $L_{RC}$, is formed in similarly as follows:

$$L_{RC} = \frac{f_1^2}{(f_1^2 - f_2^2)} L_1 - \frac{f_2^2}{(f_1^2 - f_2^2)} L_2 \cong L_1 - 1.5457(L_1 - L_2), \quad (2)$$

where $L_1$ and $L_2$ are the carrier-phase measurements scaled by the wavelengths of the L1 and L2 signals, respectively, and each includes an approximate whole-cycle ambiguity value that has been added to cause the scaled carrier-phase measurement to be close to the same value as the corresponding code measurement. Thus, $$L_1 = (\phi_1 + N_1)\lambda_1, \quad (3)$$

$$L_2 = (\phi_2 + N_2)\lambda_2, \quad (4)$$

where the whole-cycle values of $N_1$ and $N_2$ have been initialized at the start of carrier-phase tracking to give values that are within one carrier wavelength of the corresponding code measurements so as to keep the differences between the scaled carrier-phase measurements and the corresponding code measurements small. From the form of equation (2), it is noted that the refraction corrected carrier-phase measurement includes a whole-cycle ambiguity with a wavelength determined by the sum of the $f_1$ and $f_2$ frequencies, which is approximately 0.1070 meters.

Because the ionospheric effects have been removed from both the code and carrier-phase measurements by the operations performed in step 310 according to equations (1)–(4) and the effects of satellite clock and orbit errors on the pseudorange and carrier-phase measurements are the same, the values of $P_{RC}$ and $L_{RC}$ obtained in step 310 should be almost identical except for the possible whole-cycle ambiguity associated with the carrier-phase measurements and the higher multipath noise in the code measurements. This allows the formation of a carrier-phase smoothed code measurement, which approaches the small measurement noise of the carrier-phase but without the associated whole-cycle ambiguity.

Figure 3B:
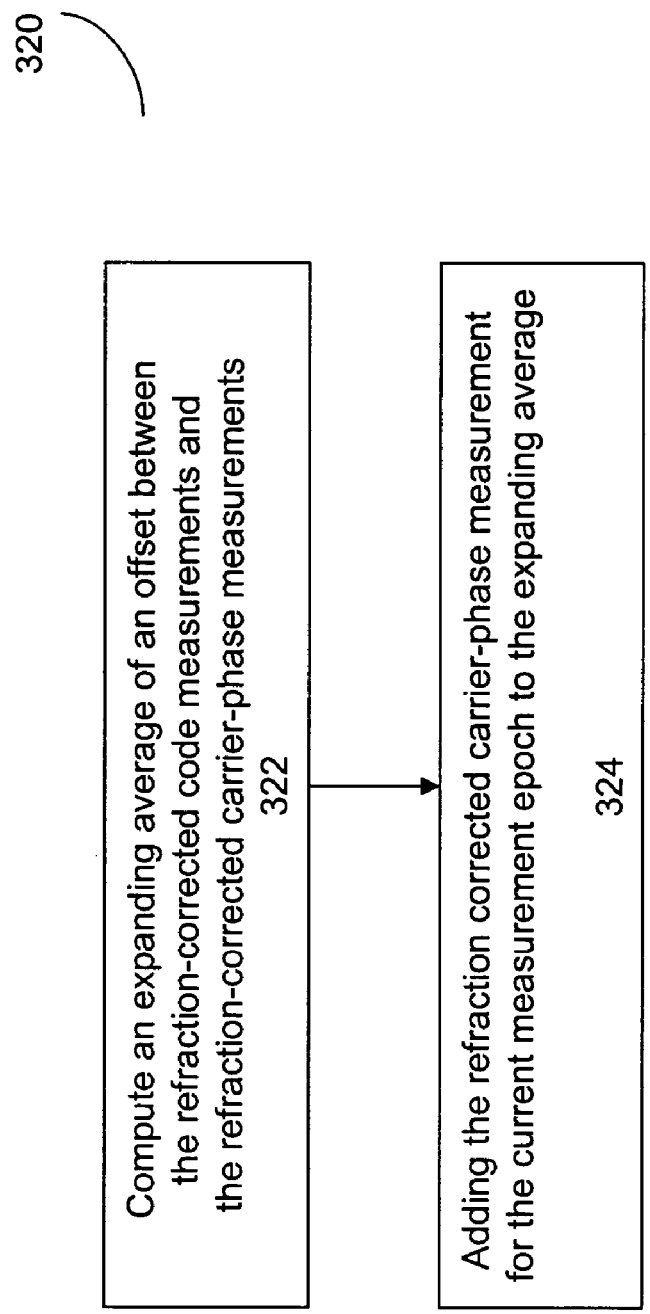
FIG. 3B is a flowchart illustrating a method for smoothing the refraction-corrected code measurement according to one embodiment of the present invention.

Thus, method 300 further includes step 320 in which the refraction corrected code measurement is smoothed by the corresponding refraction corrected carrier-phase measurement. In one embodiment of the present invention, as shown in FIG. 3B, step 320 is performed in two substeps, substep 322 and substep 324. In substep 322, for each satellite visible at the reference station, an offset between the refraction corrected code measurement and the refraction corrected carrier-phase measurement at each of a series of measurement epochs is computed and an expanding average is taken to form a smoothed offset $O_i$ as follows:

$$O_i = O_{i-1} + (P_{RC}{}^i - L_{RC}{}^i - O_{i-1})/\eta, \qquad (5)$$

where i is used to designate the current measurement epoch, and the value of $\eta$ is equal to i until a maximum value of averaging is attained. For example, if the carrier-phase measurement is assumed to have only $1/100^{th}$ of the noise of the code measurement, the value of "$\eta$" would be limited to 100 squared or 10,000.

In substep 324, the smoothed, refraction-corrected code measurement, S, is obtained by adding the refraction corrected carrier-phase measurement for the current measurement epoch to the smoothed offset, so that $$S_i = O_i + L_i. \qquad (6)$$

In an alternative embodiment, the two-step process for performing step 320 as described above can be combined into a single-step, so that:

$$S_i = \hat{S}_i + \frac{1}{\eta}\left(P_i - \hat{S}_i\right), \qquad (7)$$

where $$\hat{S}_i = S_{i-1} + L_i - L_{i-1}.$$

This single step process projects the measurement ahead using the change in the refraction corrected carrier-phase measurement and then averages the difference between that projection and the code measurement. However, the two-step process has an advantage in that the constancy of the offset value can be monitored and, if desired, a threshold change in the value can be used to edit out erroneous measurements.

Figure 3C:
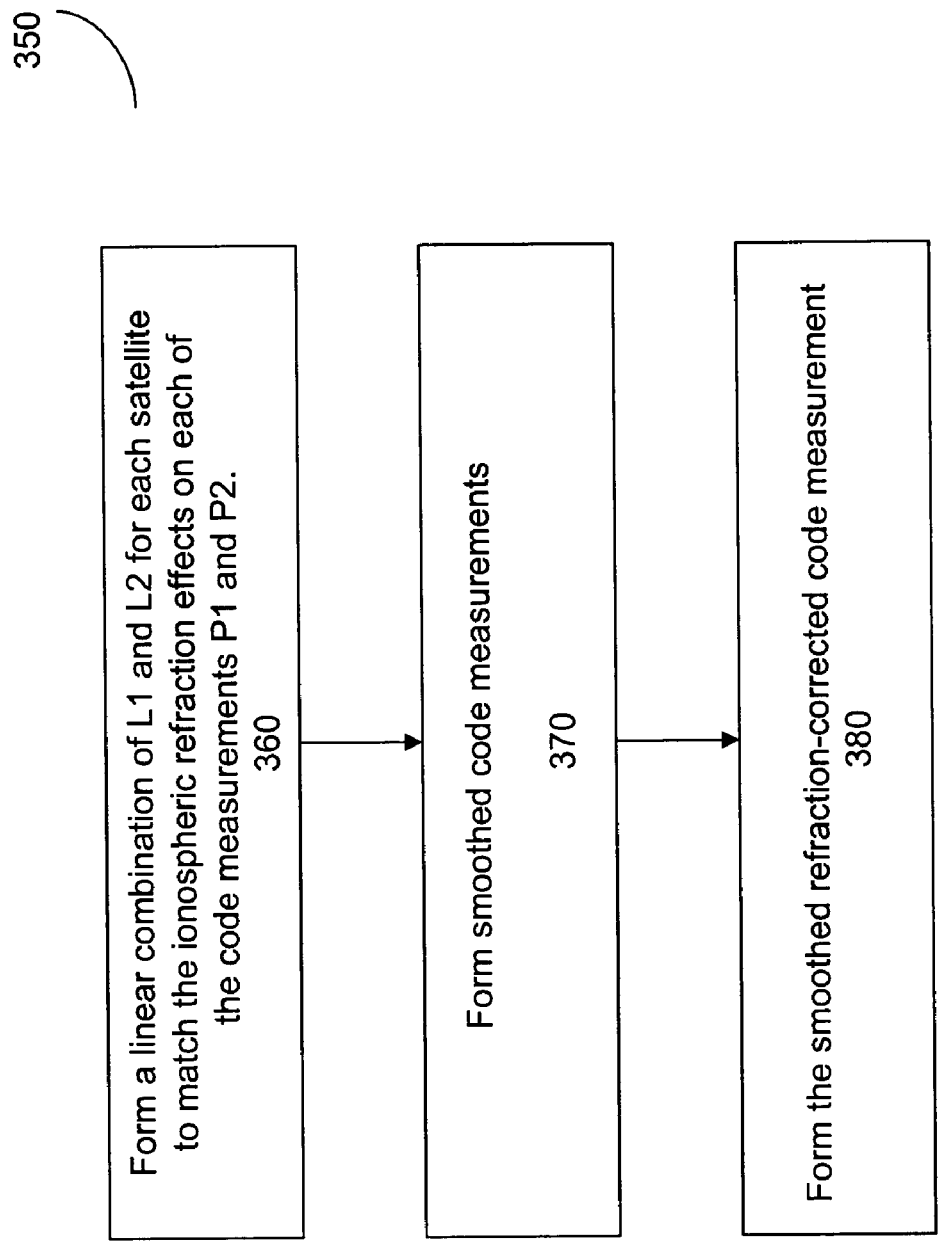
FIG. 3C is a flowchart illustrating a method for smoothing the refraction-corrected code measurement according to an alternative embodiment of the present invention.

FIG. 3C illustrates another method 350 for obtaining the smoothed refraction-corrected code measurements from GPS data obtained at a reference station, according to an alternative embodiment of the present invention. As shown in FIG. 3C, method 350 includes step 360 in which a linear combination of $L_1$ and $L_2$ for each satellite is formed to match the ionospheric refraction effects on each of the code measurements $P_1$ and $P_2$. The carrier-phase combination that matches the ionospheric refraction effect on the $P_1$ code measurement is designated as $M_1$ and is formed as follows:

$$M_1 = \frac{f_1^2 + f_2^2}{f_1^2 - f_2^2} L_1 - \frac{2f_2^2}{f_1^2 - f_2^2} L_2 \cong 4.09 L_1 - 3.09 L_2. \qquad (8)$$

The carrier-phase combination that matches the ionospheric refraction effect on the $P_2$ code measurement is designated as $M_2$ and is formed as follows:

$$M_2 = \frac{2f_1^2}{f_1^2 - f_2^2} L_1 - \frac{f_1^2 + f_2^2}{f_1^2 - f_2^2} L_2 \cong 5.09 L_1 - 4.09 L_2. \qquad (9)$$

Method 350 further includes step 370 in which, smoothed code measurements can be formed in a fashion parallel to equations (5) and (6) as follows:

$$O_{i,j} = O_{i-1,j} + (P_{i,j} - M_{i,j} - O_{i-1,j})/\eta, \qquad (10)$$

$$S_{i,j} = O_{i,j} + M_{i,j}, \qquad (11)$$

or, alternatively, parallel to equation (7) as follows:

$$S_{i,j} = \hat{S}_{i,j} + \frac{1}{\eta}\left(P_{i,j} - \hat{S}_{i,j}\right), \qquad (12)$$

where:

$$\hat{S}_{i,j} = S_{i-1,j} + M_{i,j} - M_{i-1,j}$$

where subscript j is used to designate the measurements at the two different frequencies so that j=1 or 2.

Method 350 further includes step 380 in which the final smoothed refraction-corrected code measurement is obtained via the following equation:

$$S_i = \frac{f_1^2}{(f_1^2 - f_2^2)} S_{i,1} - \frac{f_2^2}{(f_1^2 - f_2^2)} S_{i,2} \cong S_{i,1} - 1.5457(S_{i,1} - S_{i,2}) \qquad (13)$$

The value of the smoothed refraction-corrected code measurement obtained using equation (7) from the first method is mathematically equivalent to the value of the smoothed refraction-corrected code measurement obtained using equation (13) from the second method. However, since the refraction correction process amplifies noise, any edit threshold used for the change in the refraction corrected offset in equation (5) must be larger than a corresponding edit threshold of equation (10).

To compute satellite clock corrections, the smoothed refraction corrected code measurement is used to compute a residual for the corresponding GPS measurements as follows:

$$R_k{}^l = T_k{}^l - S_k{}^l \qquad (14)$$

where $R_k^l$ represents the residual, subscript k and superscript l represent the particular reference station and the particular satellite, respectively, for which the residual $R_k^l$ is formed, and $T_k^l$ represents a theoretical range between the reference station k and the satellite l. Subscript i representing the current measurement epoch is suppressed in Equation (14) and in all of the following discussions. The theoretical range $T_k^l$ may be calculated conventionally using the known position of the reference station. The calculation of the theoretical range may include an adjustment or corrections for the tropospheric refraction effects computed based on a theoretical model for the tropospheric refraction effects. The theoretical range may also include adjustment or corrections for the satellite orbital errors. These corrections may be computed in a separate or off-line module. They may also be computed less frequently than the computation of clock corrections.

In one embodiment of the present invention, to generate the satellite clock corrections, a master station is selected among a group of reference stations including some or all of the reference stations in the WADGPS network. The master reference station can be selected based on a judgment that its clock is the most accurate among the group of reference stations, or a determination that it has measurements available from the largest number of satellites among the group of reference stations, or some combined function of these or other factors, or even arbitrarily. The reference stations other than the master reference station are referred to below as local reference stations.

Figure 4A:
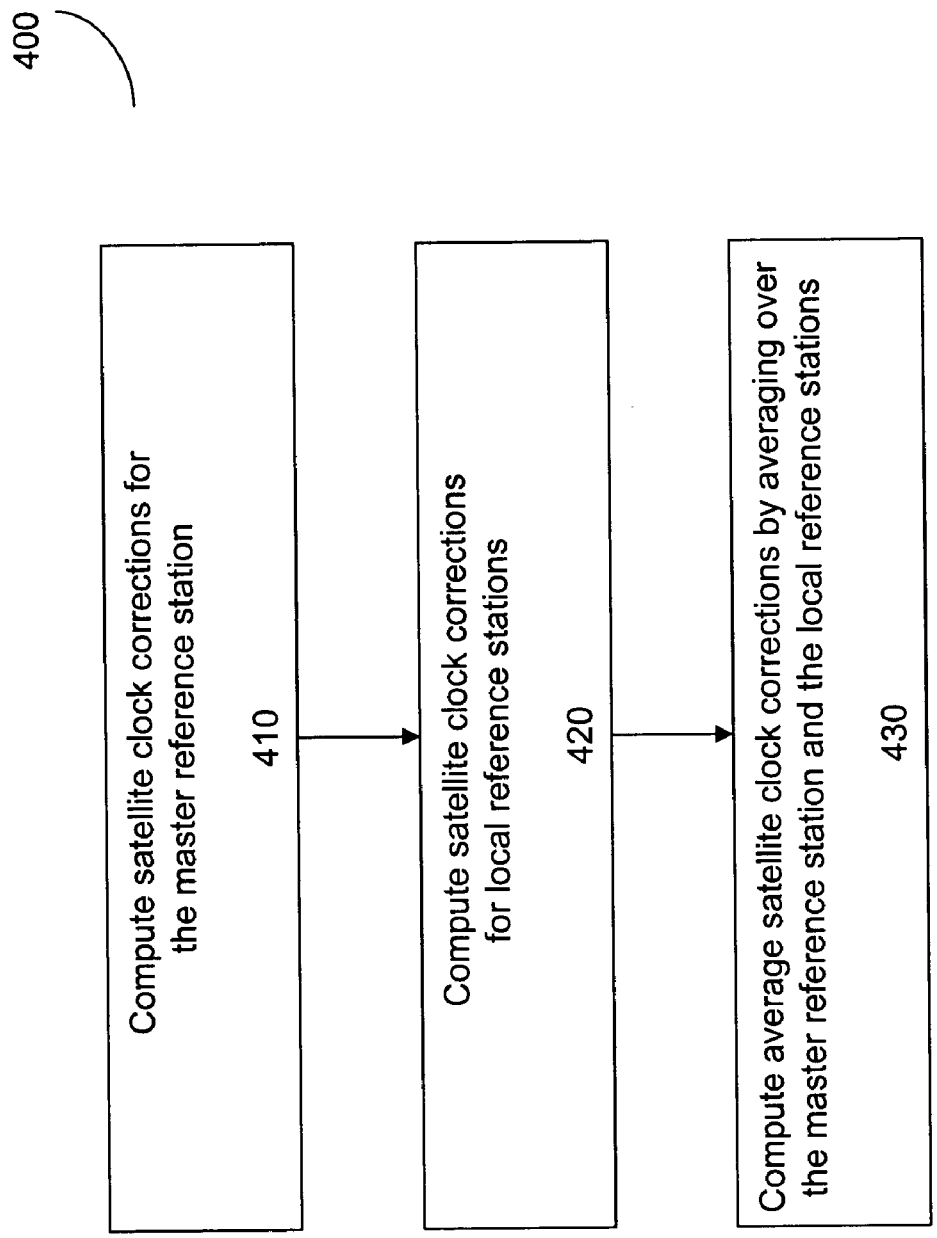
FIG. 4A is a flowchart illustrating a method for computing satellite clock corrections for the WADGPS network according to one embodiment of the present invention.

FIG. 4A illustrates a method 400 for generating satellite clock corrections for the WADGPS network 200 according to one embodiment of the present invention. As shown in FIG. 4A, method 400 includes step 410 in which satellite clock corrections are computed at the current measurement epoch i for the master reference station. In one embodiment of the present invention, for the master reference station, a master clock correction for a satellite visible at the master reference station is computed as follows:

$$r_0^l = R_0^l - M_0, \quad (15)$$

where subscript 0 is used to represent the master reference station, $r_0^l$ represents the master clock correction for satellite l as computed, and $M_0$ represents a master mean receiver clock error. Note that in the above equation and in some of the following equations, the satellite clock corrections are expressed in terms of distance for application as direct corrections to the measured ranges. The master mean receiver clock error is computed as follows:

$$M_0 = \frac{1}{m_0} \sum_\lambda R_0^\lambda, \quad (16)$$

where the summation is over a group of satellites visible at the master reference station, $\lambda$ represents one of the group of satellites, and $m_0$ represents the number of satellites in the group of satellites.

Method 400 further includes step 420 in which satellite clock corrections are computed at the current measurement epoch i for one or more local reference stations each having at least one common satellite with the master reference station. A reference station has a common satellite with another reference station, or the satellite is common to both of the reference stations, when both of the reference stations have GPS measurements available from the satellite to form the smoothed refraction-corrected code measurements for the satellite at the current measurement epoch as described above.

For a local reference station, a local clock correction for a satellite common to the local reference station and the master reference station is computed as follows:

$$r_k^l = R_k^l - M_k, \quad (17)$$

where $r_k^l$ represents the local clock correction for local reference station k for satellite l, and $M_k$ represents a local mean receiver clock error. The local mean receiver clock error is computed as follows:

$$M_k = \frac{1}{m_k} \sum_\lambda (R_k^\lambda - r_0^\lambda) = M_0 + \Delta M_k \quad (18)$$

where the summation is over a group of satellites visible at both the master reference station and the local reference station k, $\lambda$ represents one of this group of satellites, $m_k$ represents the number of satellites in this group of satellites, and $$\Delta M_k = \frac{1}{m_k} \sum_\lambda (R_k^\lambda - R_0^\lambda) = \frac{1}{m_k} \sum_\lambda (R_k^\lambda - r_0^\lambda) - M_0$$

represents the difference between the local mean clock error for the local reference station k and master mean receiver clock error. The summation in Equation (18) is over satellites common to the master reference station and the reference station k, and $m_k$ represents the number of such satellites. Once $M_k$ is obtained using satellites common to the master reference station and the local reference station in equation (18), local clock correction for other satellites visible at the local reference station and not to the master reference station can be computed by computing equation (17) for those satellites.

After obtaining satellite clock corrections for the individual reference stations in step 420, method 400 further includes step 430 in which an average clock correction is computed for every satellite visible either at the master reference station or visible at some or all of the local reference stations having one or more common satellites with the master reference station. In one embodiment of the present invention, an average clock correction is computed for a satellite in step 430 by averaging the clock corrections computed for the satellite in step 420, as expressed by the following equation:

$$c^l = \frac{1}{p} \sum_k r_k^l \quad (19)$$

where the summation is over reference stations to which satellite l is visible and p is the number of such reference stations.

Figure 4B:
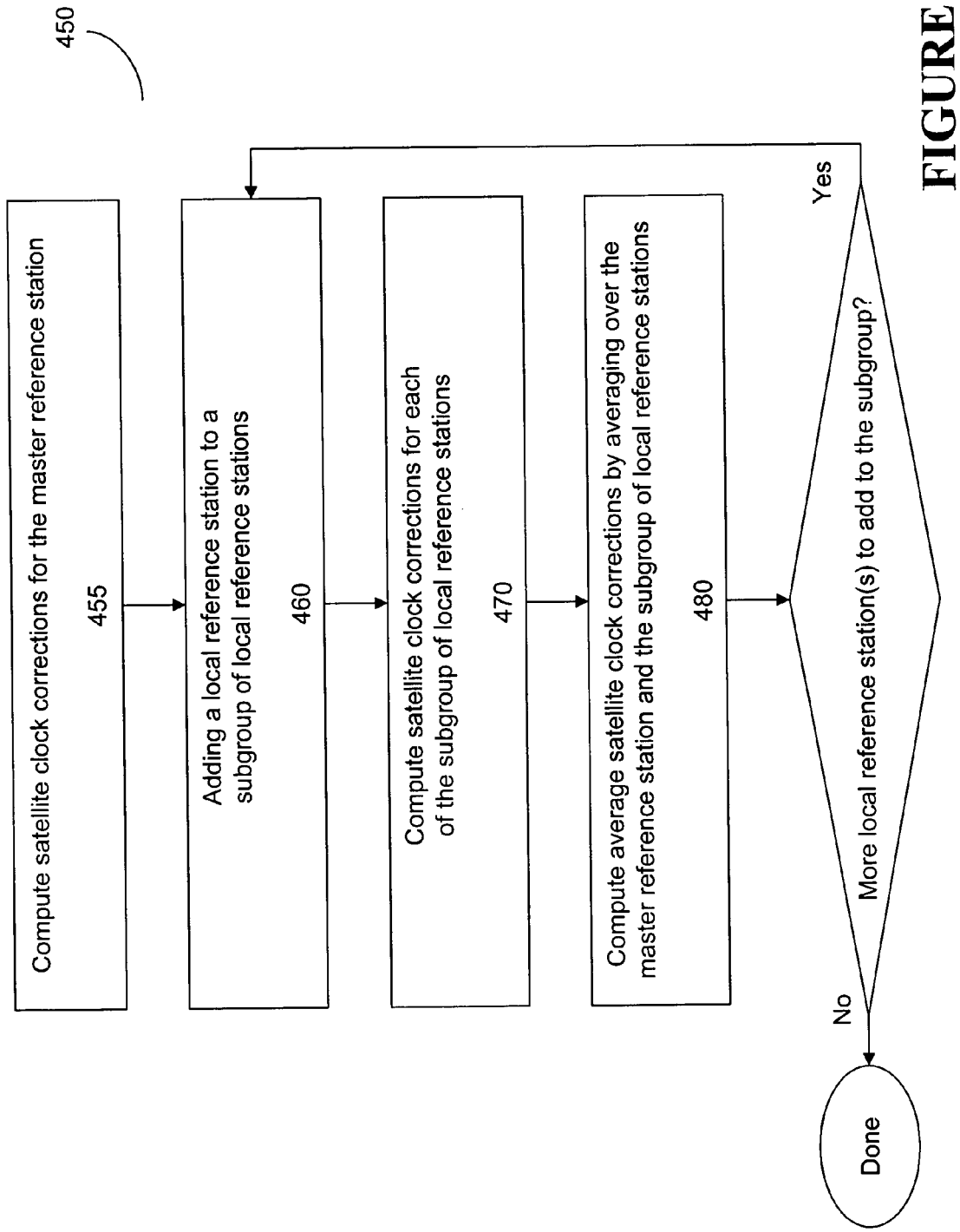
FIG. 4B is a flowchart illustrating a method for computing satellite clock corrections for the WADGPS network according to an alternative embodiment of the present invention.

FIG. 4B illustrates a method 450 for generating satellite clock corrections for the WADGPS network 200 according to an alternative embodiment of the present invention. In method 450, the satellite clock corrections are computed iteratively. In each iteration, Equations (17) and (18) are computed for each of a subgroup of local reference stations, and the average in Equation (19) is over the master reference station and the subgroup of local reference stations. The subgroup of local reference stations originally includes no reference station and a local reference station is added to the subgroup of local reference stations in each iteration.

As shown in FIG. 4B, method 450 includes step 455 in which satellite clock corrections are computed for the master reference station according to Equations (15) and (16). Method 450 then proceeds to step 460 in which a first local reference station is added to the subgroup of local reference stations. The first local reference station is preferably a local reference station having the most number of common satellites with the master reference station. Method 450 then proceeds to step 470 in which satellite clock corrections are computed for the first local reference station using Equations (15) through (18), and to step 480 in which average clock corrections are computed by averaging the satellite clock corrections computed for the master reference station and the first local reference station using Equation (19).

If there are other local reference stations having common satellites with the master reference station, method 450 goes back to step 460 to add one of these other local reference stations to the subgroup of local reference stations. In general, a reference station sharing the next largest number of common satellites with the master reference station is selected. Then, method 450 proceeds to perform the calculations in step 470 and 480 for the new subgroup using equations (17) through (19) except that the term $r_0^l$ in Equation (18) is replaced by $c^l$ computed using Equation (19) in step 470 in the previous iteration. Thus, the iteration continues until all of the local reference stations sharing common satellites with the master reference station have been included in the subgroup of local reference stations and average clock corrections are calculated considering the subgroup of local reference stations.

The iterative computation of Equations (17) through (19) is especially useful for a global DGPS network because a problem can occur in a global DGPS network when there are few if any common satellites visible at both the master reference site and the particular reference site for which satellite clock corrections are being computed. This can cause equation (19) to be either poorly defined or even undefined, and the problem can be overcome by the iteration process in method 450.

Method 400 or 450 for generating satellite clock corrections is simple and effective. Various modifications to the method can be made to improve the accuracy of the computed satellite clock corrections without departing from the sprit and scope of the present invention. For example, method 400 or 450 can be modified so that a weighted combination of the satellite clock corrections computed for the individual reference stations is used on the right hand side of Equation (19) to form the average clock correction. The individual reference stations can be weighted in equation (19) to reflect the angular positions of the satellites visible at the reference stations, or an apparent noise level of the GPS receiver at each reference station.

Method 400 or 450 may also be modified to allow the mean clock error $M_k$ to change only slowly from one measurement epoch to the next measurement epoch by using a conventional smoothing filter. If the mean clock error $M_k$ is allowed to change by a large discrete jump, it can cause step changes in the clock corrections which then alias into the user receiver clock solution. This can cause a navigation error if the user GPS receiver employs a navigation algorithm that does not allow step changes in the receiver clock solution.

Figure 4C:
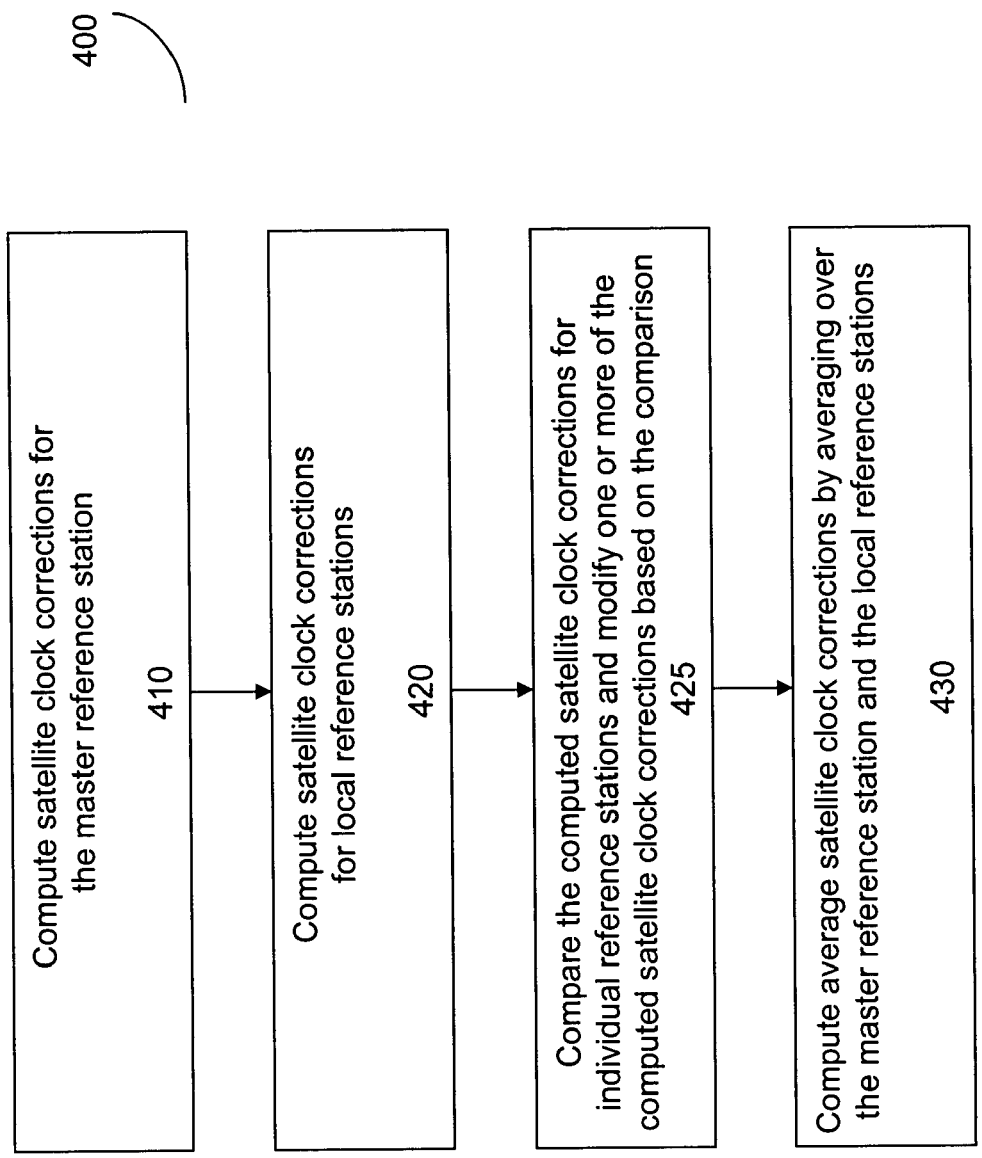
FIG. 4C is a flowchart illustrating a method for computing satellite clock corrections for the WADGPS network according to another alternative embodiment of the present invention.
Figure 4D:
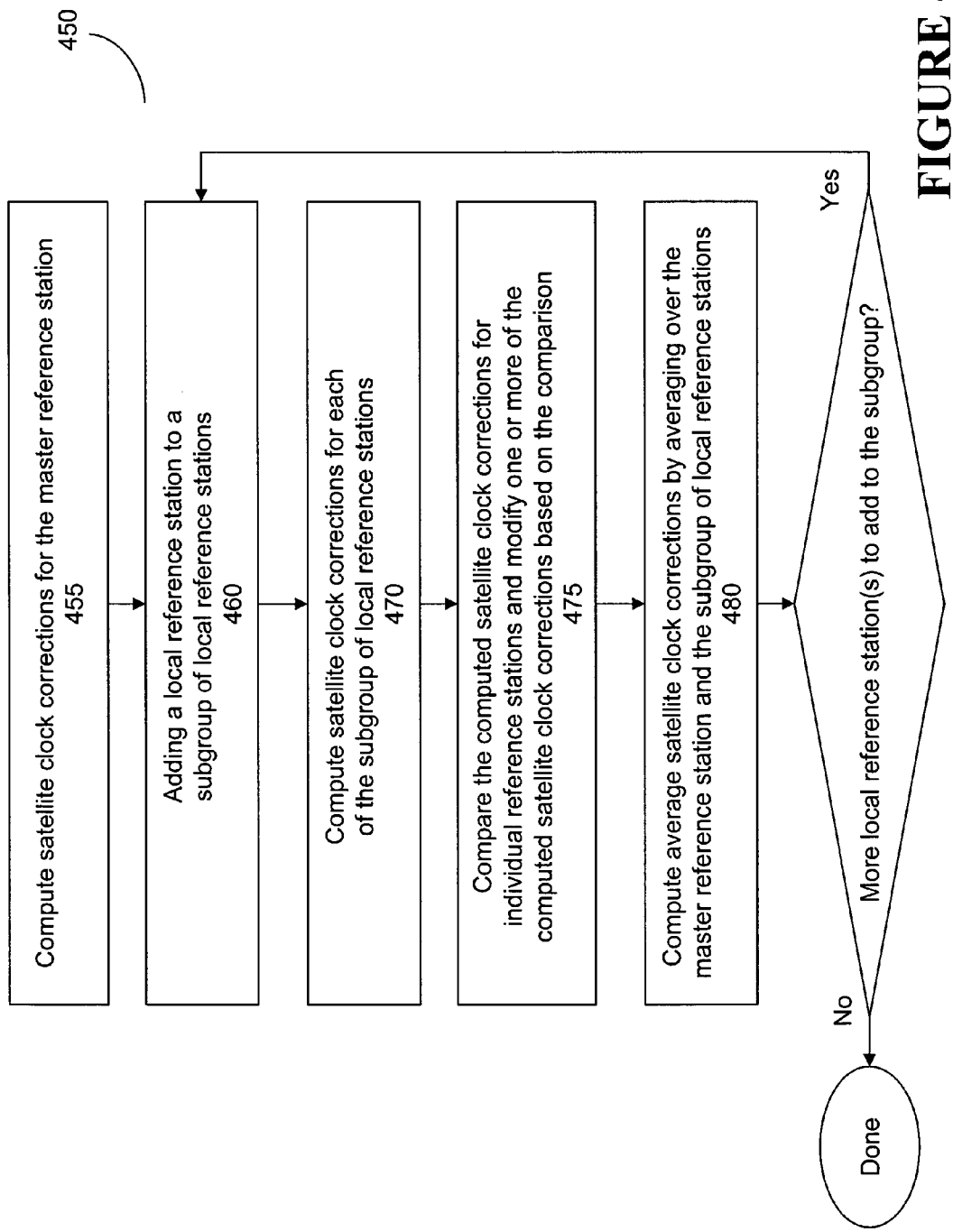
FIG. 4D is a flowchart illustrating a method for computing satellite clock corrections for the WADGPS network according to yet another alternative embodiment of the present invention.

Method 400 or 450 may also be modified by adding a step 425 between steps 420 and 430 in method 400, as shown in FIG. 4C, or step 475 between steps 470 and 480 in method 450, as shown in FIG. 4D. In step 425 or 475, the computed values of the clock corrections for the individual reference stations are compared with each other, and if the clock correction for one reference station is found to differ substantially from those for the other reference stations, it can be edited or replaced with a substitute value before the average clock corrections are computed in step 430 or 470.

Method 400 or 450 may also be modified by forming a weighted combination of $R_0^l$ at the right hand side of Equation (16) and/or a weighted combination of $(R_k^l - r_0^l)$ at the right hand side of Equation (18) according to the elevation angles of the satellites over which the summations in the Equations are taken. Also, if the value of $(R_k^l - r_0^l)$ for one satellite in equation (16) differs substantially from those obtained for the other satellites, it can be edited or replaced with an appropriate substitute value.

An evaluation of the spread of values of $(R_k^l - r_0^l)$ entering into the summation on the right hand side of equation (18) can also be used to adjust on a site by site basis the model used to compute the tropospheric refraction effect. A small stochastic adjustment could improve the response of the computed clock corrections to local weather conditions. This can be accomplished by a procedure which adjusts an overhead tropospheric refraction coefficient such that difference between $(R_k^l - r_0^l)$ at different reference sites is minimized. In such a process the data from satellites with a low elevation may be weighted higher since they are more sensitive to the tropospheric refraction effects.

Methods, 300, 350, 400, and 450 as described above may be carried out by the main computer system 200 of the WADGPS system with the reference stations supplying the GPS pseudorange and carrier phase measurements. Alternatively, the smoothed refraction corrected code measurements and the residuals may be computed at each of the individual reference stations by the computer system 124 coupled to the GPS receiver at the reference station. The computation results are then transmitted to the main computer system 200 for further processing according to the embodiments of the present invention.

Thus, the present invention provides a simple and effective method for generating GPS satellite clock corrections for a WADGPS network. The computed satellite clock corrections are not affected by the ionospheric refraction effects because they are removed by the use of dual-frequency measurements. The satellite orbital errors, because they change much more slowly, can either be removed in a separate computational process when the WADGPS is a global DGPS network, or may simply be ignored when the WADGPS network is for a continental sized region. The troposhperic refraction effect can be largely removed by modeling and if desired can be improved by use of small stochastic adjustments included with the clock correction computation. The multipath effects are removed from the code measurements by smoothing with the corresponding carrier-phase measurements. After removing these error factors, the method then provides a simple but very accurate computation of the satellite clock corrections for either continental-sized or global GPS networks.

We claim:

1. A method for generating GPS satellite clock corrections, comprising:
    obtaining dual-frequency pseudorange code measurements and carrier-phase measurements from a plurality of satellites;
    for each of the plurality of satellites, forming a smoothed refraction-corrected code measurement based on the dual-frequency pseudorange code measurements and carrier-phase measurements from the satellite, wherein the forming is performed for each of a series of measurement epochs preceding and including a current measurement epoch, wherein forming the smoothed refraction-corrected code measurement at the current measurement epoch includes smoothing refraction-corrected code measurements with refraction-corrected carrier phase measurements, and wherein smoothing the refraction-corrected code measurement includes forming projections of the smoothed refraction-corrected code measurements using changes in the carrier-phase measurements between two consecutive measurement epochs and computing an expanding average of differences between the projections and the refraction-corrected code measurements over a series of measurement epochs; and
    computing clock corrections for the plurality of satellites based on the smoothed refraction-corrected code measurements.

2. The method of claim 1 wherein smoothing the refraction-corrected code measurement comprises:
    computing a smoothed offset between the refraction corrected code measurements and the refraction corrected carrier-phase measurements; and
    forming the smoothed refraction corrected code measurement by adding the refraction corrected carrier-phase measurement at the current measurement epoch to the smoothed offset.

3. A method for generating GPS satellite clock corrections. comprising:
    obtaining dual-frequency pseudorange code measurements and carrier-phase measurements from a plurality of satellites;
    for each of the plurality of satellites, forming a smoothed refraction-corrected code measurement based on the dual-frequency pseudorange code measurements and carrier-phase measurements from the satellite; and
    computing clock corrections for the plurality of satellites based on the smoothed refraction-corrected code measurements;
    wherein the dual-frequency pseudorange code measurements and carrier-phase measurements from each of the plurality of satellites includes a pseudorange code measurement and a carrier-phase measurement corresponding to each of two carrier signal frequencies and at each of a series of measurement epochs, and wherein forming the smoothed refraction-corrected code measurement for each satellite comprises:
    for each of the series of measurement epochs and for each carrier signal frequency, forming a linear combination of the carrier-phase measurements corresponding to the two carrier signal frequencies from the satellite, such that the linear combination of the carrier-phase measurements matches ionospheric refraction effects on the pseudorange code measurement for the carrier signal frequency from the satellite;
    forming a smoothed code measurement for each carrier signal frequency by smoothing the pseudorange code measurements for the carrier signal frequency with the matching linear combinations of the dual-frequency carrier-phase measurements; and
    computing the smoothed refraction-corrected code measurement based on the smoothed code measurements for the two carrier signal frequencies.

4. A method for generating GPS satellite clock corrections, comprising:
    obtaining dual-frequency pseudorange code measurements and carrier-phase measurements from a plurality of satellites;
    for each of the plurality of satellites, forming a smoothed refraction-corrected code measurement based on the dual-frequency pseudorange code measurements and carrier-phase measurements from the satellite; and
    computing clock corrections for the plurality of satellites based on the smoothed refraction-corrected code measurements;
    wherein the dual-frequency pseudorange code measurements and carrier-phase measurements are obtained at a reference GPS receiver having a known location and wherein computing the clock corrections comprises:
    computing a residual for each of the plurality of satellites by subtracting a theoretical range between the reference GPS receiver and the satellite from the smoothed refraction-corrected code measurement for the satellite;
    forming a mean receiver clock error as a linear combination of the residuals for the plurality of satellites; and
    computing a clock correction for each of the plurality of satellites by subtracting the mean receiver clock error from the residual computed for the satellite.

5. The method of claim 4 wherein the theoretical range includes an adjustment for tropospheric effects.

6. The method of claim 4 wherein the theoretical range includes an adjustment for satellite orbital errors.

7. The method of claim 4 wherein the linear combination of the residuals for the plurality of satellites includes a weighted combination of the residuals according to elevation angles of the plurality of satellites as observed by the reference GPS receiver.

8. A method for generating satellite clock corrections for a wide-area GPS network having a plurality of reference stations including a master reference station and a plurality of local reference stations, comprising:
    for each reference station, obtaining a smoothed refraction-corrected code measurement for each satellite visible to the reference station formed using GPS measurements taken from the satellite at the reference station;
    computing a master clock correction for each satellite visible to the master reference station using the smoothed refraction-corrected code measurements for the master reference station;
    for each of the plurality of local reference stations, computing a local clock correction for each satellite common to the master reference station and the local reference station using smoothed refraction-corrected code measurements for the master reference station and for the local reference station; and
    computing an average clock correction for each satellite visible to the master reference station by forming a linear combination of the master clock correction and the local clock corrections computed for the satellite.

9. The method of claim 8 wherein computing local clock corrections and computing average clock corrections are iterated and the average clock corrections in one iteration round is used to compute the local clock corrections in a next iteration round.

10. The method of claim 9 wherein the linear combination for the average clock correction is weighted according elevation angles at which the satellite is visible to the master reference station and to the local reference stations.

11. The method of claim 8 wherein the theoretical range between a reference station and a satellite visible to the reference station includes an adjustment for the tropospheric refraction effects on the GPS measurements obtained at the reference station for the satellite.

12. The method of claim 8 wherein the theoretical range between a reference station and a satellite visible to the reference station includes an adjustment for the satellite orbital errors in the GPS measurements obtained at the reference station for the satellite.

13. The method of claim 8 wherein for each reference station and for each satellite visible to the reference station, the smoothed refraction-corrected code measurement is formed by:
    forming refraction-corrected code measurements and refraction-corrected carrier-phase measurements using dual-frequency GPS pseudorange measurements and carrier-phase measurements, respectively, taken from the satellite at the reference station at a series of measurement epochs; and
    smoothing the refraction corrected code measurements with the refraction corrected carrier-phase measurements.

14. The method of claim 8 wherein for each reference station and for each satellite visible to the reference station, the smoothed refraction-corrected code measurement is formed by:
    forming at each of a series of measurement epochs and for each carrier signal frequency a linear combination of dual frequency carrier-phase measurements such that the linear combination matches the ionospheric refraction effect on the corresponding pseudorange code measurement;
    computing a smoothed code measurement for each carrier signal frequency by smoothing the pseudorange code measurements for the carrier signal frequency with the matching linear combinations of the dual frequency carrier-phase measurements; and
    combining the smoothed code measurements to form the smoothed refraction-corrected code measurement.

15. The method of claim 8 wherein computing the master clock correction for each satellite visible to the master reference station comprises:
    obtaining a master residual for each satellite visible to the master reference station, the master residual being an offset of the smoothed refraction-corrected code measurement for the satellite for the master reference station from a theoretical range between the satellite and the master reference station;
    computing a master mean receiver clock error based on the master residuals; and
    subtracting the master mean receiver clock error from the master residuals.

16. The method of claim 15 wherein computing the master mean receiver clock error comprises forming an average of the master residuals over the satellites visible to the reference station.

17. The method of claim 15 wherein computing the master mean receiver clock error comprises forming a linear combination of the master residuals weighted by elevation angles of the satellites as observed by the master reference station.

18. The method of claim 15 wherein computing the local clock corrections for a local reference station comprises:
    obtaining a local residual for each satellite common to the master reference station and the local reference station, the local residual being an offset of the smoothed refraction-corrected code measurement for the satellite for the local reference station from a theoretical range between the satellite and the local reference station;
    computing a local mean receiver clock error based on the local residuals and the master residuals; and
    subtracting the local mean receiver clock error from the local residuals.

19. The method of claim 18 wherein computing the local mean receiver clock error comprises:
    for each satellite common to the local reference station and the master reference station, computing an offset of the local residual from the master residual; and
    forming a linear combination of the offsets over the satellites common to the local reference station and the master reference station.

20. The method of claim 19 wherein the offsets in the linear combination are weighted by elevation angles of the satellites as observed by the local reference station.

21. A method for forming a smoothed refraction-corrected code measurement based on dual-frequency GPS pseudorange measurements and carrier-phase measurements taken from a satellite by a GPS receiver, comprising:
    for each of a series of measurement epochs preceding and including a current measurement epoch, forming a refraction-corrected code measurement based on the dual frequency pseudorange code measurements from the satellite and a refraction-corrected carrier-phase measurement based on the dual-frequency carrier phase measurements from the satellite; and
    smoothing the refraction-corrected code measurements with the refraction-corrected carrier phase measurements to obtain a smoothed refraction-corrected code measurement at the current measurement epoch,
    wherein smoothing the refraction-corrected code measurement includes forming projections of the smoothed refraction-corrected code measurements using changes in the carrier-phase measurements between two consecutive measurement epochs, and computing an expanding average of differences between the projections and the refraction-corrected code measurements over a series of measurement epochs.

22. The method of claim 21 wherein smoothing the refraction-corrected code measurement comprises:
    computing a smoothed offset between the refraction corrected code measurements and the refraction corrected carrier-phase measurements; and
    forming the smoothed refraction corrected code measurement by adding the refraction corrected carrier-phase measurement for the current measurement epoch to the smoothed offset.

23. A method for forming a smoothed refraction-corrected code measurement based on dual-frequency GPS pseudorange measurements and carrier-phase measurements taken from a satellite at a GPS receiver, comprising:
    forming at each of a series of measurement epochs and for each carrier signal frequency a linear combination of the dual-frequency carrier-phase measurements to match the ionospheric refraction effect on the corresponding pseudorange code measurement;

forming a smoothed code measurement for each carrier signal frequency by smoothing the pseudorange code measurements with the matching linear combinations of the dual-frequency carrier-phase measurements; and combining the smoothed code measurements to form the smoothed refraction-corrected code measurement, wherein combining the smoothed code measurements to form the smoothed refraction-corrected code measurement includes forming projections of the smoothed refraction-corrected code measurements using changes in the carrier-phase measurements between two consecutive measurement epochs, and computing an expanding average of differences between the projections and the refraction-corrected code measurements over a series of measurement epochs.

24. A computer readable medium comprising computer executable program instructions that when executed cause a digital processing system to perform a method for generation GPS satellite clock corrections, the method comprising:

obtaining dual-frequency pseudorange code measurements and carrier-phase measurements from a plurality of satellites;

for each of the plurality of satellites, forming a smoothed refraction-corrected code measurement based on the dual-frequency pseudorange code measurements and carrier-phase measurements from the satellite, wherein the forming is performed for each of a series of measurement epochs preceding and including a current measurement epoch, forming the smoothed refraction-corrected code measurement at the current measurement epoch includes smoothing refraction-corrected code measurements with refraction-corrected carrier phase measurements, and wherein smoothing the refraction-corrected code measurement includes forming projections of the smoothed refraction-corrected code measurements using changes in the carrier-phase measurements between two consecutive measurement epochs and computing an expanding average of differences between the projections and the refraction-corrected code measurements over a series of measurement epochs; and computing clock corrections for the plurality of satellites based on the smoothed refraction-corrected code measurements.

25. A computer readable medium comprising computer executable program instructions that when executed cause a digital processing system to perform a method for generation satellite clock corrections for a wide-area GPS network having a plurality of reference stations including a master reference station and a plurality of local reference stations, the method comprising:

for each reference station, obtaining a smoothed refraction-corrected code measurement for each satellite visible to the reference station formed using GPS measurements taken from the satellite at the reference station;

computing a master clock correction for each satellite visible to the master reference station using the smoothed refraction-corrected code measurements for the master reference station;

for each of the plurality of local reference stations, computing a local clock correction for each satellite common to the master reference station and the local reference station using smoothed refraction-corrected code measurements for the master reference station and for the local reference station; and computing an average clock correction for each satellite visible to the master reference station by forming a linear combination of the master clock correction and the local clock corrections computed for the satellite.

* * * * *